(12) United States Patent
Subramanian et al.

(10) Patent No.: US 8,014,278 B1
(45) Date of Patent: Sep. 6, 2011

(54) ADAPTIVE LOAD BALANCING BETWEEN ECMP OR LAG PORT GROUP MEMBERS

(75) Inventors: Krishnamurthy Subramanian, Mountain View, CA (US); Eddie Tan, San Jose, CA (US); Rajeev Manur, Fremont, CA (US)

(73) Assignee: Force 10 Networks, Inc, San Jose, CA (US)

( * ) Notice: Subject to any disclaimer, the term of this patent is extended or adjusted under 35 U.S.C. 154(b) by 338 days.

(21) Appl. No.: 12/316,915

(22) Filed: Dec. 17, 2008

Related U.S. Application Data

(60) Provisional application No. 61/007,872, filed on Dec. 17, 2007.

(51) Int. Cl.
*G01R 31/08* (2006.01)
(52) U.S. Cl. ........ 370/229; 370/235; 370/389; 370/419; 709/238

(58) Field of Classification Search ........................ None
See application file for complete search history.

(56) References Cited

U.S. PATENT DOCUMENTS

| | | | |
|---|---|---|---|
| 5,522,046 A * | 5/1996 | McMillen et al. | 709/239 |
| 7,535,895 B2 * | 5/2009 | Medved et al. | 370/360 |
| 2004/0240470 A1 * | 12/2004 | Medved et al. | 370/469 |
| 2006/0274647 A1 * | 12/2006 | Wang et al. | 370/216 |

\* cited by examiner

*Primary Examiner* — Bob A Phunkulh

(57) ABSTRACT

A packet network device has multiple equal output paths for at least some traffic flows. The device adjusts load between the paths using a structure that has more entries than the number of equal output paths, with at least some of the output paths appearing as entries in the structure more than once. By adjusting the frequency and/or order of the entries, the device can effect changes in the portion of the traffic flows directed to each of the equal output paths. Other embodiments are described and claimed.

18 Claims, 11 Drawing Sheets ion). The state of that link contains a description of the
ADAPTIVE LOAD BALANCING BETWEEN ECMP OR LAG PORT GROUP MEMBERS

CROSS-REFERENCE TO RELATED APPLICATIONS

This application claims priority to co-owned, co-pending U.S. Provisional Patent Application Ser. No. 61/007,872, filed Dec. 17, 2007, by Krishnamurthy Subramanian and Eddie Tan, entitled ADAPTIVE LOAD BALANCING BETWEEN ECMP OR LAG PORT GROUP MEMBERS, which is incorporated herein by reference in its entirety.

BACKGROUND

1. Field of the Invention

The present disclosure relates generally to Equal Cost MultiPath (ECMP) nexthop sets and Link Aggregation Groups (LAGs), and more particularly to systems and methods for implementing adaptive load balancing between ports belonging to a nexthop set and/or link aggregation group.

2. Description of Related Art

In a packet network, "nodes" or "routers" share network address information that allows each node or router to forward packets toward their respective destination networks. For networks defined using the Internet Protocol, each node is provisioned with a network address that identifies the particular network the system is on, and with a system or host address that uniquely identifies the node. These addresses are shared among neighboring nodes to allow each router to build a "tree" with itself as the root node and next-hop paths from itself to every address on the network.

IP addresses consist of a 32-bit (for IPv4) or 48-bit (for IPv6) address that is a concatenation of the network address and the host address. Considering the 32-bit IPv4 address with variable-length subnet masking as an example, some number of the leading address bits are used as the network subaddress, and the remaining bits are used as the host subaddress. For instance, two devices could both be located on the network 192.168.10.0/24, which represents the four bytes of an IPv4 address as four decimal values separated by periods. The suffix "/24" denotes a network subnet mask, i.e., it states that the first 24 bits (192.168.10) are the network portion of the IP address, and thus by default the last eight bits are the host address. Thus two hosts on this network could have the IP addresses 192.168.10.2 and 192.168.10.4.

Routers use IP network and host addresses to forward routed traffic on a packet network according to a routing protocol. Some common routing protocols in use today include Open Shortest Path First (OSPF), Intermediate System to Intermediate System (IS-IS), and Border Gateway Protocol (BGP). OSPF is further described in Internet Engineering Task Force (IETF) Request for Comments (RFC) 2328, "OSPF Version 2," by J. Moy, April 1998, and IETF RFC 2740, "OSPF for IPv6," R. Coltun, December 1999. IS-IS is further described in the International Organization for Standardization (ISO) document ISO 8473, "Intermediate System to Intermediate System Routing Information Exchange Protocol for Providing the Connectionless-mode Network Service," ISO/IEC10589:2002, $2^{nd}$ Ed. BGP is further described in IETF RFC 4271, "A Border Gateway Protocol 4 (BGP-4)," by Y. Rekhter et al., January 2006.

OSPF and IS-IS are examples of link-state protocols. A "link" can be considered to be an interface or port on a router (although such protocols can be used to distribute other information). The state of that link contains a description of the interface and what routers/networks are reachable through that link. In OSPF, a link-state database would contain the IP address of the interface/device, the subnet mask and other information describing the network, a list of routers connected to that network, a cost of sending packets across that interface, etc.

OSPF routers use link-state advertisements (LSAs) to share information from their link-state databases with neighboring routers in the same autonomous system. Whenever an interface is brought up or a change in routing information known to the router occurs, the router generates a LSA to inform its neighbors of the new or changed link-state information. When a neighbor router receives the LSA, it updates its own link-state database and then propagates the information in another LSA to its neighbors. Thus the LSA is flooded to all routers, and all routers contain the same link-state database.

Whenever a router receives an update to its link-state database, it uses a shortest path algorithm (the Dijkstra algorithm) to calculate a shortest path tree to all destinations, based on the accumulated costs associated with the links used to reach each destination. The shortest path tree will differ for each router, as each places itself at the root of the tree, but all routers should agree with each other as to routes. In other words, no routing loops should exist where node A thinks that a destination should be reached through a node B, and node B thinks that the destination should be reached through node A.

In order to place limits on the flooding of LSAs, OSPF allows routers in the same autonomous system to be grouped into areas. For instance, FIG. 1 depicts two areas A0, A1 of an autonomous system (AS) 100. Every AS must have an area 0 or backbone area. Generally, all other areas connect to the backbone area, although provisions exist for transit areas.

Routers are classified according to their position in the AS. An internal router has all of its interfaces in the same area. In area A0, routers R1 and R2 are internal routers. In area A1, router R5 is an internal router. An area border router (ABR) has interfaces in multiple areas of the AS. R3 has two interfaces in area A0, and at least one interface in another area (not shown), and is thus an ABR. Likewise R4 has two interfaces in area A0, and two interfaces in area A1, making it an ABR as well. An autonomous system boundary router (ASBR) has at least one interface in an area of the AS and at least one interface to another AS or running another routing protocol. The ASBR redistributes information received from the foreign network/protocol within OSPF. In FIG. 1, routers R6 and R7 are ASBRs. Both R6 and R7 communicate with a router R8 outside of the AS using BGP.

Assuming that the routing algorithm cost is the same for R5 to reach either R6 or R7, and the cost is the same for either R6 or R7 to reach R8, R5 has two equal cost paths available (R5-R6-R8 and R5-R7-R8) that it may use to forward traffic for routes advertised by R8. Routing protocols such as OSPF and IS-IS allow two such routes to have equal cost. Equal-Cost MultiPath (ECMP) algorithms, such as those described in Internet Engineering Task Force (IETF) Request For Comments (RFC) 2991, "Multipath Issues in Unicast and Multicast Next-Hop Selection," 2000, incorporated herein by reference, splits traffic between multiple equal-cost next-hops by approaches such as hashing of partial packet header contents. When successful, such an approach increases the bandwidth available between two nodes beyond the bandwidth available on a single link.

Independent of routing and ECMP, in high-performance networks more traffic may need to pass between two adjacent nodes than can be carried on a single link. Link aggregation refers to a layer-2 process for operating a group of physical links as if they were a single link. At least one standard for logical link aggregation has been promulgated by the Institute of Electrical and Electronic Engineers, e.g., in the IEEE 802.3-2005 standard, Clause 43 and Annexes 43A-C, incorporated herein by reference. This standard sets out an orderly process for adjacent nodes to recognize that both nodes share multiple links that each node allows to be managed as a single logical link. This concept is shown in FIG. 1 as parallel links L1, L2 connecting R5 and R6, and parallel links L3 and L4 connecting R5 and R7. Like ECMP, link aggregation splits traffic between multiple paths (in this case the aggregated links), potentially increasing the bandwidth available between two nodes beyond the bandwidth available on a single link.

In FIG. 1, when a packet arriving on link L5 at R5 has a next-hop of R8, ECMP allows R5 to select either R6 or R7 as a first hop. Once R6 or R7 is selected, LAG selects one of the two available parallel links to the selected first hop router for transmission of the packet.

FIG. 2 contains a block diagram for one possible implementation of R5 as a modular switch/router. Up to n line cards, LC0 to LCn−1, serve the external ports of the device, including the five FIG. 1 labeled ports L1, L2, L3, L4, and L5. Ports L1 and L2 connect to two port interfaces of line card LC0; port L5 connects to one of the port interfaces of line card LCi; and ports L3 and L4 connect to two port interfaces of line card LCn−1.

Each line card LCi contains, in addition to the external port interfaces, one or more packet processors PPi, a content-addressable memory CAMi, a line card processor LCPi, and one or more switch fabric buffers. The packet processors read and manipulate headers on the packets/frames passing through their respective port interfaces. As part of this process, the packet processor typically performs one or more lookup operations on the corresponding CAM, which stores forwarding information, allowing the packet processor to determine an appropriate outgoing port interface or port interfaces for the packet. An incoming packet processor attaches a small "backplane" header to each packet, which includes the appropriate egress port(s), and submits the packets to the switch fabric buffers. An outgoing packet processor operates in the reverse direction—it reads packets from the switch fabric buffers, removes the backplane headers and performs any necessary processing, and submits them to the appropriate egress port(s).

The line cards mate with a backplane 210, which may be electrical and/or optical, containing signal paths to connect the line cards with one or more switch fabric cards, SFC, and one or more route processor manager cards, RPM. The switch fabric card(s) contain a high-throughput switch fabric SF that moves incoming packets in the various line card switch fabric buffers to the appropriate switch fabric buffers for the indicated egress ports. The route processor manager card RPM includes one or more processors that manage overall operation of the card, including a route processor RP.

The route processor RP maintains a global view of the attached network(s), including which layer 3 hosts and networks are reachable through each port, the layer 2 status of each port, the LAN segments/hosts reachable through each port, etc. The routing/switching protocols running on the RP communicate over the backplane with each line card processor LCPi to receive updated information pertinent to each line card's ports. The RP communicates routing/switching updates back to each line card processor LCPi, which LCPi uses to update the contents of CAMi. In the specific FIG. 1 example, the RP runs OSPF and is aware of the LAG connecting R5 to R6 and the other LAG connecting R5 to R7. This information allows RP to communicate forwarding entries to LCP1 for storage in CAM1. When a packet arrives on L5 having a destination reachable through R8, PP1 will consult the appropriate forwarding entries to select one of L1, L2, L3, and L4 as an outgoing interface for the packet.

One possible packet processor egress interface selection mechanism 300 is shown in FIG. 3. When a packet P1 arrives at the packet processor, a lookup engine LE obtains a copy of the packet headers. Lookup engine LE combines information from the packet headers in various ways to construct a number of keys, including a CAM key and a hash key. The hash key is supplied to a hash calculator HC, which hashes the key to produce a hash value. Simultaneously, the CAM key is supplied to a forwarding table FT, e.g., stored in the CAM, which returns the appropriate forwarding entry for the packet. When the forwarding entry matches an ECMP set or link aggregation group, a multiple interface flag MIF is set to indicate that selection of one of multiple outbound interfaces is required. In that case, a number of interfaces field #IF in the forwarding entry is extracted and supplied to a MOD function, which returns the remainder of the hash value divided by #IF (a number between 0 and #IF-1), labeled the selector. The selector is used to index one of the #IF entries in an IF list to determine the correct outbound IF. The IF list may be embedded in the forwarding entry, or may be stored elsewhere and pointed to by the forwarding entry.

BRIEF DESCRIPTION OF THE DRAWINGS

The present invention can be best understood by reading the specification with reference to the following Figures, in which.

DETAILED DESCRIPTION

Figure 1:
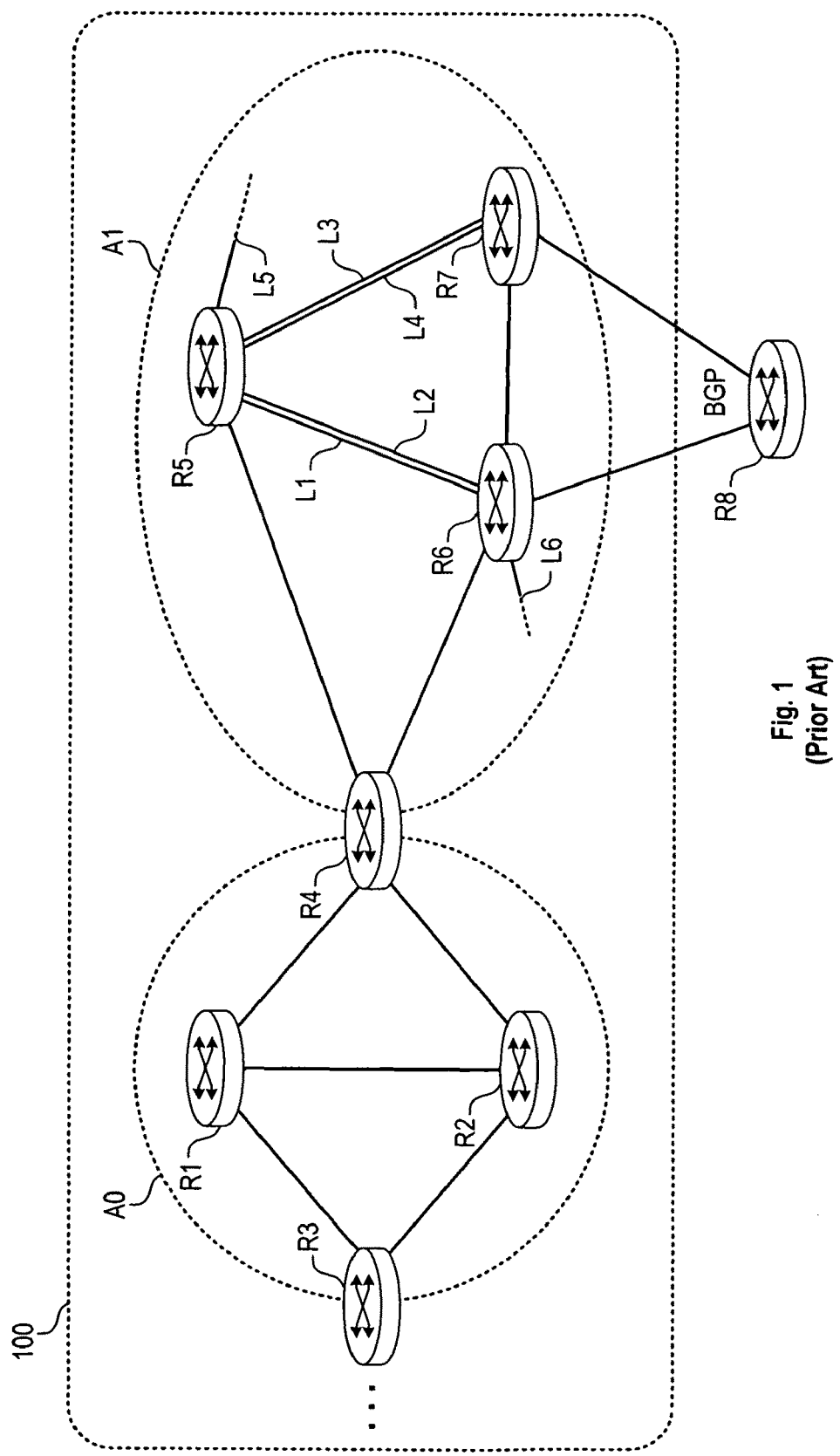
FIG. 1 illustrates a prior art network configuration for an exemplary OSPF autonomous system.
Figure 2:
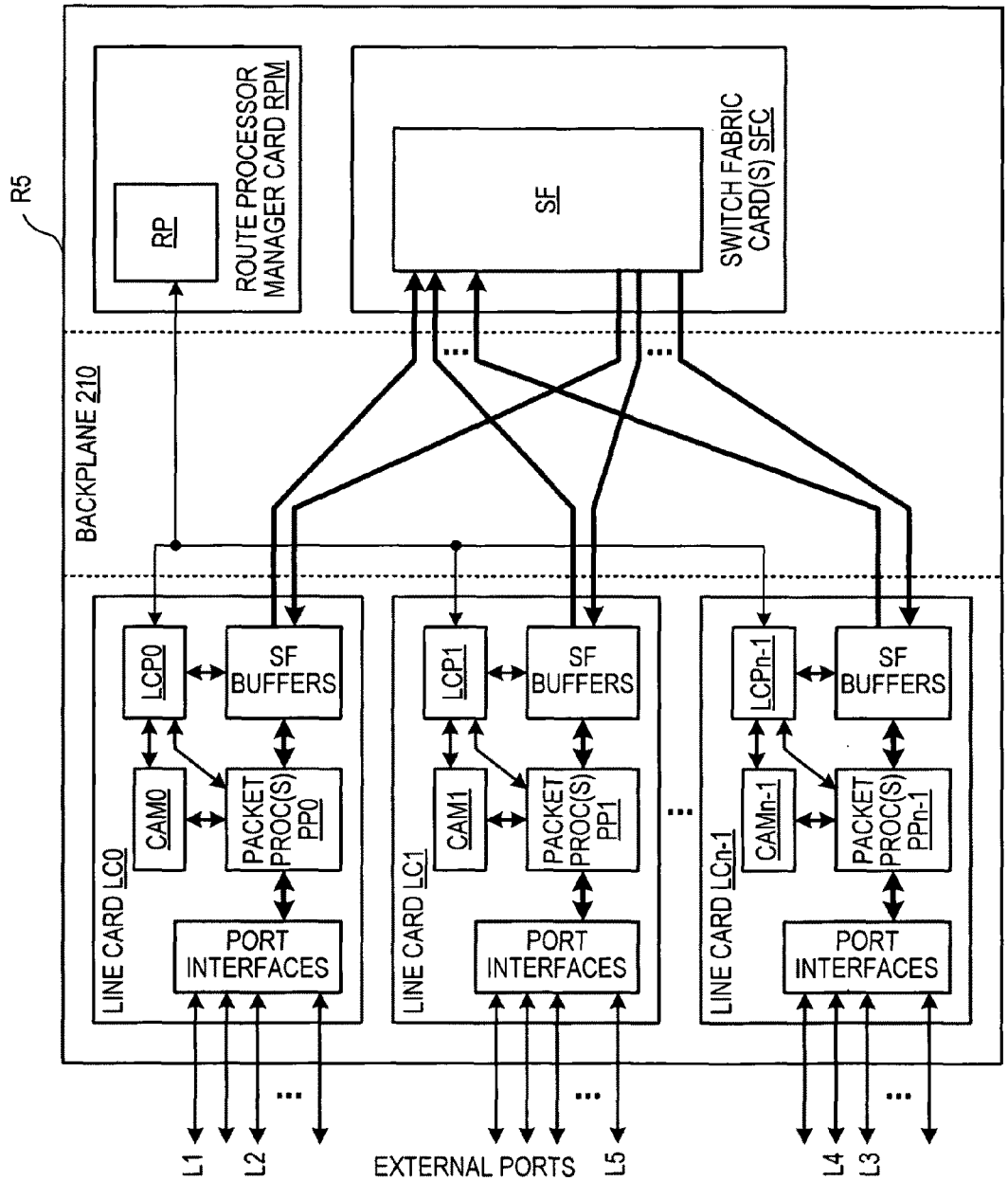
FIG. 2 contains a block diagram for a prior art modular switch.
Figure 3:
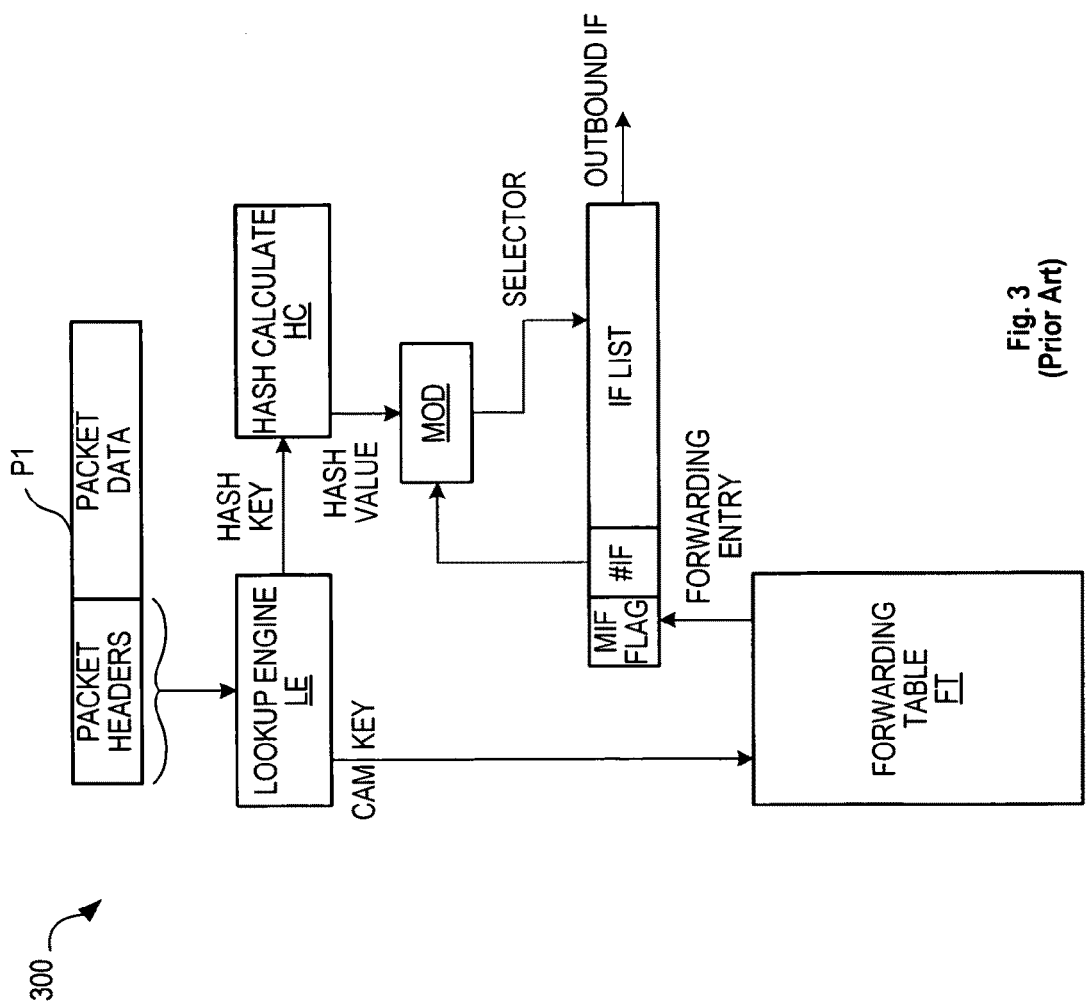
FIG. 3 contains a block diagram for prior art packet processing hardware for selecting one of several possible egress ports for forwarding of a packet.

A well-designed hash function can approximate a uniform distribution for the selection of an outbound interface for each packet flow that utilizes an ECMP next hop set or link aggregation group. Because packet flows vary greatly in their bandwidth demands, however, even a perfectly uniform distribution of packet flows will not generally result in a uniform distribution of bandwidth among the ECMP and/or LAG interfaces. Furthermore, ECMP traffic on an interface is shared with non-ECMP traffic and/or overlapping ECMP next hop sets. Referring back to FIG. 1, R5 traffic having a destination reachable through L6 on R6 will utilize L1 and L2, but not L3 and L4, potentially causing imbalances and overloading even when ECMP is distributing traffic to R8 through the four interfaces perfectly.

It has now been recognized that an ECMP and/or LAG implementation having an automatic mechanism to correct imbalances between a group of outgoing interfaces is desirable. The present disclosure focuses on a group of approaches that are applicable to existing hash-based hardware, and yet provide mechanisms to influence the selection of interfaces so as to compensate for static or dynamic imbalances in interface utilization.

In existing hash-based approaches, several header fields such as MAC (Media Access Control) source and destination addresses, IP source and destination addresses, packet type, TCP (Transport Control Protocol) or UDP (Uniform Datagram Protocol) port pairings, etc., are combined to produce a hash key. The hash key is supplied to hash calculate hardware (or software), which produces a hash value HV of a given number of bits B. The MOD function then calculates I-IV MOD n, where n is the number of alternate interfaces available for the packet. As the hash function is deterministic, when the same hash key is supplied the same B-bit hash value will be returned. As the MOD function is also deterministic, packets from the same flow will always be forwarded to the same one of n interfaces.

Considering a hash function that takes all possible keys and distributes them uniformly, the hash value represents one of $2^B$ possible values, or "bins". All packet flows that hash to the same bin will always be sent to the same interface. It is recognized herein that although these bin assignments cannot be changed without modifying the hash key or the hash function itself, it is possible to manipulate which bins are assigned to which interface. Furthermore, it has now been recognized that when the problem is structured properly, groups of bins can be moved at ease—and importantly, predictably—between different interfaces to offset traffic imbalances.

Figure 4:
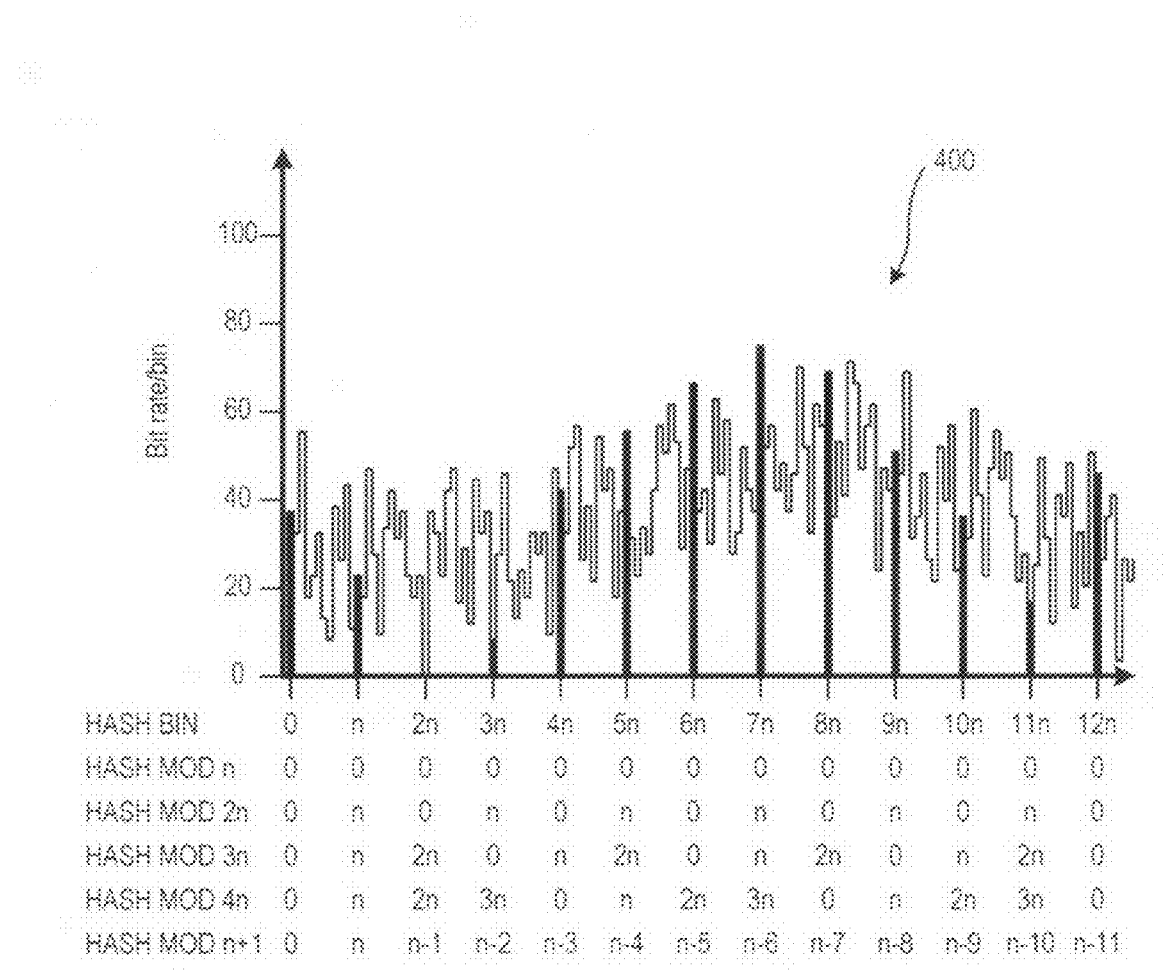
FIG. 4 shows, for a hash function, a hypothetical distribution of traffic flows into each hash bin.

FIG. 4 contains a plot 400 for a portion of a hypothetical hash function distribution of packet flows to a number of hash bins. Every nth bin is highlighted with a corresponding black bar and labeled with a number. The rows of numbers under each corresponding label correspond to interface assignments obtained with MOD functions on hash values with different divisors, n, 2n, 3n, 4n, and n+1.

Performing the MOD function with a divisor of n corresponds to a case where each marked bin 0, n, 2n, . . . is directed to interface 0 in a list of interfaces. Note that with 2n interfaces and a modulo divisor of 2n, half of the marked bins are still directed to interface 0, but the other half of the marked bins (every other one of the marked interfaces: n, 3n, etc.) are directed instead to interface n. Although not shown explicitly, this same effect happens with other bins as well (half of the bins directed to interface 1 with modulo n are redirected to interface n+1 with modulo 2n, etc.).

A similar pattern occurs for other multiples of n. With 3n interfaces and a modulo divisor of 3n, the bins that originally were directed to interface 0 are directed equally and in round-robin fashion to interfaces 0, n, and 2n. With 4n interfaces and a modulo divisor of 4n, the bins that originally were directed to interface 0 are directed equally and in round-robin fashion to interfaces 0, n, 2n; and 3n.

A different effect is observed when the number of interfaces and modulo divisor are incremented from n to n+1. In this case, the bin assignments are completely reset—the bins previously assigned to interface 0 are distributed to all interfaces.

In some of the following described embodiments, these effects are used to effect transfers of packet flows between interfaces. An interface grouping that contains more members than the actual number of interfaces is created—and then manipulated via the assignment of the extra members to multiple entries for the same interface to effectuate changes in the bin-to-interface mapping.

Figure 5:
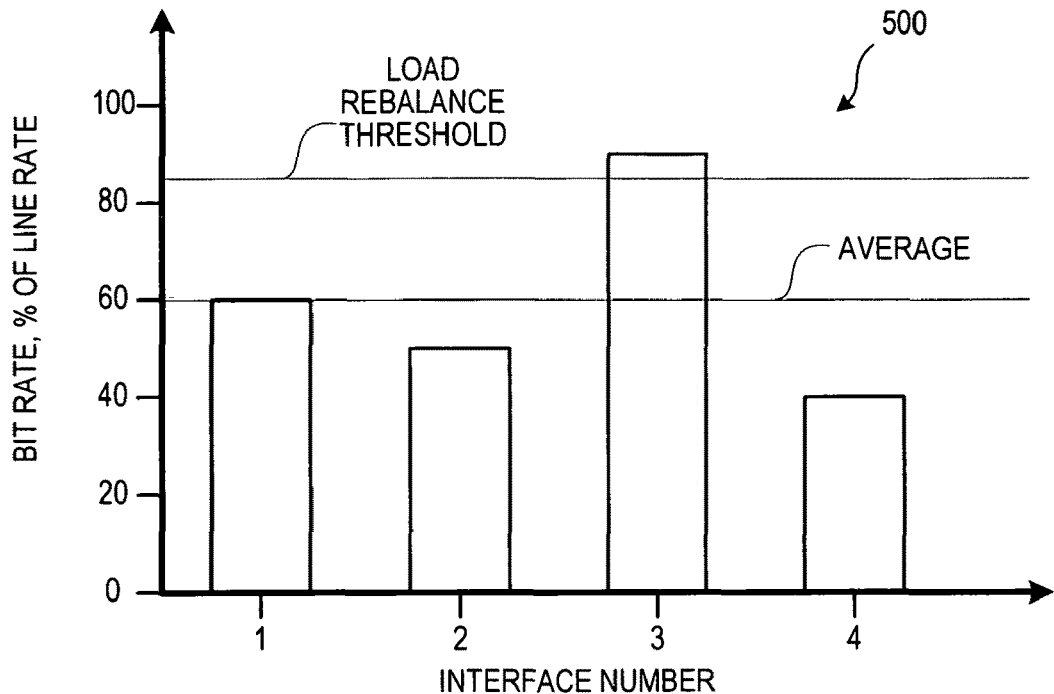
FIG. 5 contains a chart illustrating unequal distribution of traffic among four ECMP or LAG member ports.

FIG. 5 contains a bar chart 500, showing the observed traffic rate, as a percentage of line rate (the maximum rate of the physical link), for each of four interfaces 1, 2, 3, and 4 that belong to the same ECMP next-hop set or LAG. Although the average bit rate among all four interfaces is 60% of the line rate, only interface 1 is operating at 60%. Interfaces 2 and 4 are operating at 50% and 40% of line rate, respectively, while interface 3 is operating at 90% of line rate.

In this embodiment, each interface reports, through the line card processors on its respective card, its traffic load to an adaptive load balancing process running on the RP. The adaptive load balancing process sets a load rebalance threshold, which can be for instance a fixed percentage of line rate (when other interfaces are not above the percentage as well), or a fixed percentage of the average bit rate for the group. When an interface exceeds the threshold, a rebalance iteration is initiated.

Figure 6:
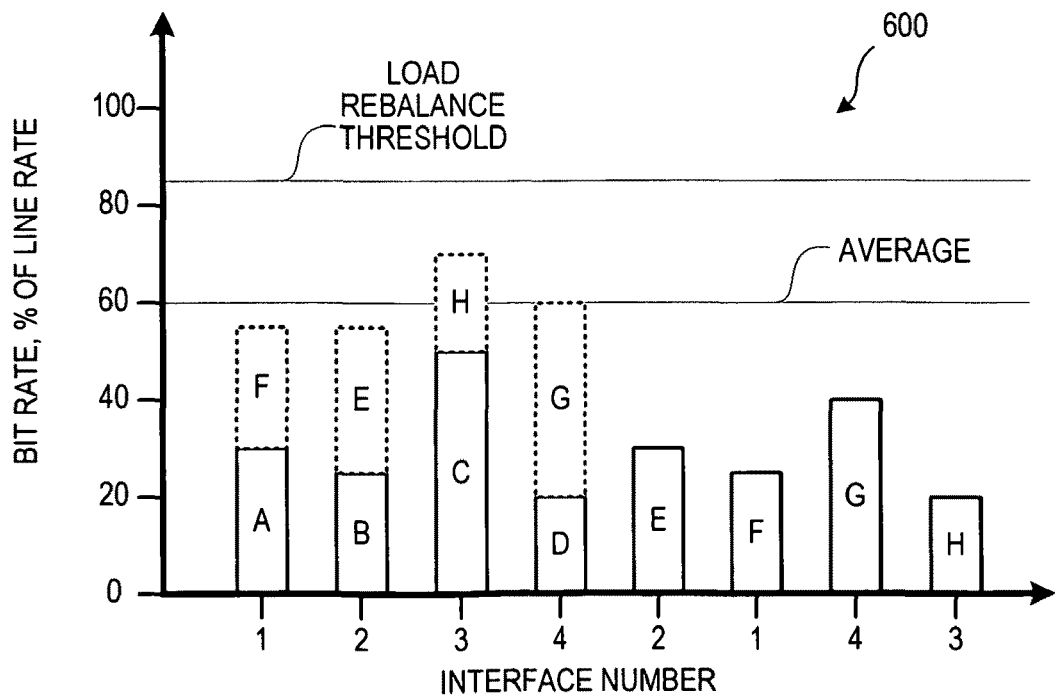
FIG. 6 contains a chart illustrating adaptive balancing of the distribution of traffic among the FIG. 5 member ports, according to an embodiment.

In this embodiment, a first rebalance iteration causes the number of entries in the group list to double, with each interface in the group occupying two entries. As shown in FIG. 6, the hash bins that previously mapped to interface 1 now are split between two groups—'A' and 'E'. The hash bins that previously mapped to interface 2 now are split between groups 'B' and 'F', the hash bins that previously mapped to interface 3 now are split between groups 'C' and 'G', and the hash bins that previously mapped to interface 4 now are split between groups 'D' and 'H'.

Were the interfaces mapped to the group list entries as 1-2-3-4-1-2-3-4, the new mapping would not transfer any hash bins to a different interface. To effect a change, the interface from the FIG. 5 mapping with the highest load (interface 3) and the interface with the lowest load (interface 4) are identified. In the second set of four group list entries, the position of these two interfaces is swapped. The next highest and next lowest load interfaces (1 and 2, respectively) from FIG. 5 are identified, and are swapped in the second set of four group list entries, such that the interfaces mapped to the group list entries in the order 1-2-3-4-2-1-4-3. Referring back to FIG. 4, this causes half of the hash bins previously assigned to interface 1 to switch to interface 2, and vice-versa, and half of the hash bins previously assigned to interface 3 to switch to interface 4, and vice-versa. Although this does not guarantee an equal traffic distribution, it should help. In FIG. 6, the hash bin groups E, F, G, and H have been stacked in hidden lines on top of the hash bin groups A, B, C, and D, showing that the variance and maximum excursion from the mean for the traffic distributed to each interface have been significantly reduced.

Figure 7:
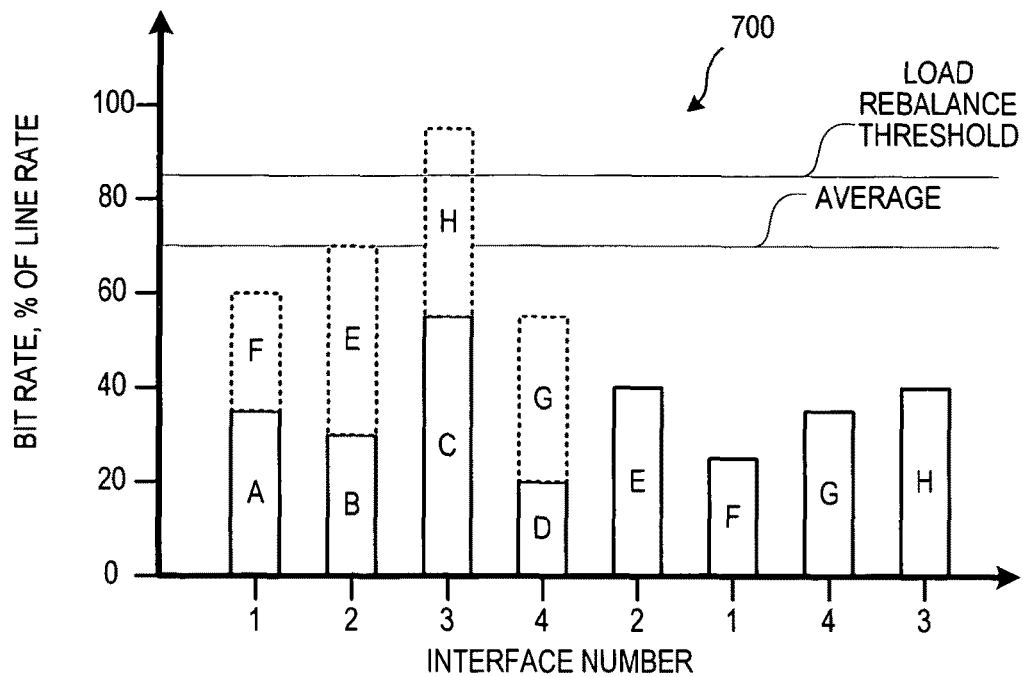
FIG. 7 contains a chart illustrating a subsequently occurring unequal distribution of traffic among the four member ports of FIG. 5.
Figure 8:
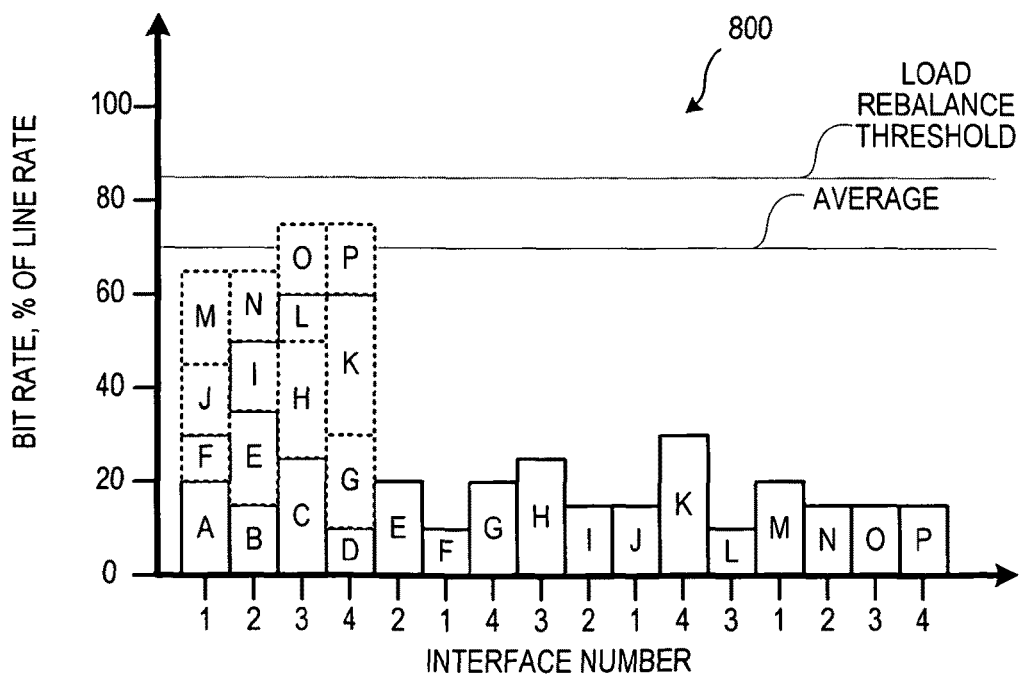
FIG. 8 contains a chart illustrating adaptive balancing of the distribution of traffic among the FIG. 5 member ports, according to an embodiment.

In the new group list mapping of FIG. 6, traffic loads on the different interfaces could also diverge over time. In FIG. 7, the average load has risen to 70%, and interface 3, which carries hash bin groups C and H, now carries a load of 95%. This causes a second rebalance iteration, where the 8 group list mapping entries are expanded to 16, as shown in FIG. 8. In this example, it is once again desired that some hash bin groups move between interfaces 1 and 2, and between interfaces 3 and 4, due to the reported loading. To effect a change, the locations of interfaces 1 and 2 in the second half of the new mapping are reversed as are the locations of interfaces 3 and 4. This once again moves half of the hash bin groups associated with each interface to another interface.

Figure 9:
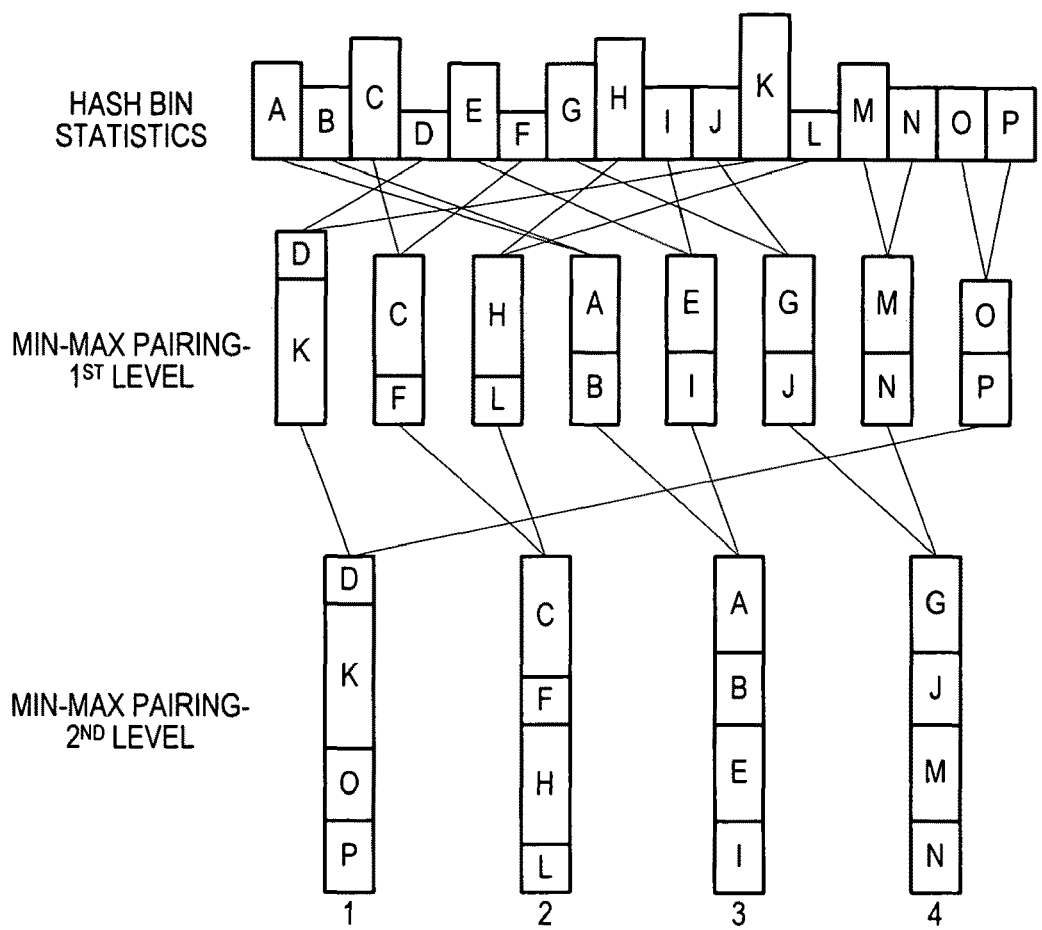
FIG. 9 illustrates, diagrammatically, a hash bin adaptive balancing process according to an embodiment.

In an extended capability embodiment, some unit or units in the packet/switch gather statistics as to the traffic load distributed to each hash bin group. For instance, FIG. 9 shows bars A-P, corresponding to the hash bin groups of FIG. 8, each having a height corresponding to a measured traffic load distributed to that hash bin group. The adaptive load balancing process performs a first level min-max pairing, where the hash bin group with the greatest load (K in this example) pairs with the hash bin group with the lowest load (D in this example), the hash bin group with the next greatest load (C in this example) pairs with the hash bin group with the second lowest load (F in this example), etc. A second level min-max pairing then considers the hash bin group pairs from the first level, pairing the pair having the greatest load (K-D in this example) with the pair having the lowest load (O-P in this example), etc. After the second pairing, other pairings can be performed if the groups are not yet reduced to the number of physical interfaces. Also, if imbalances still exist, a final iteration can consider whether moving a hash bin group from one pairing to another pairing will improve the load balance. Furthermore, if the number of hash bin groups is not a power of two of the number of interfaces, some pairings can be of groups of three, etc.

Figure 10:
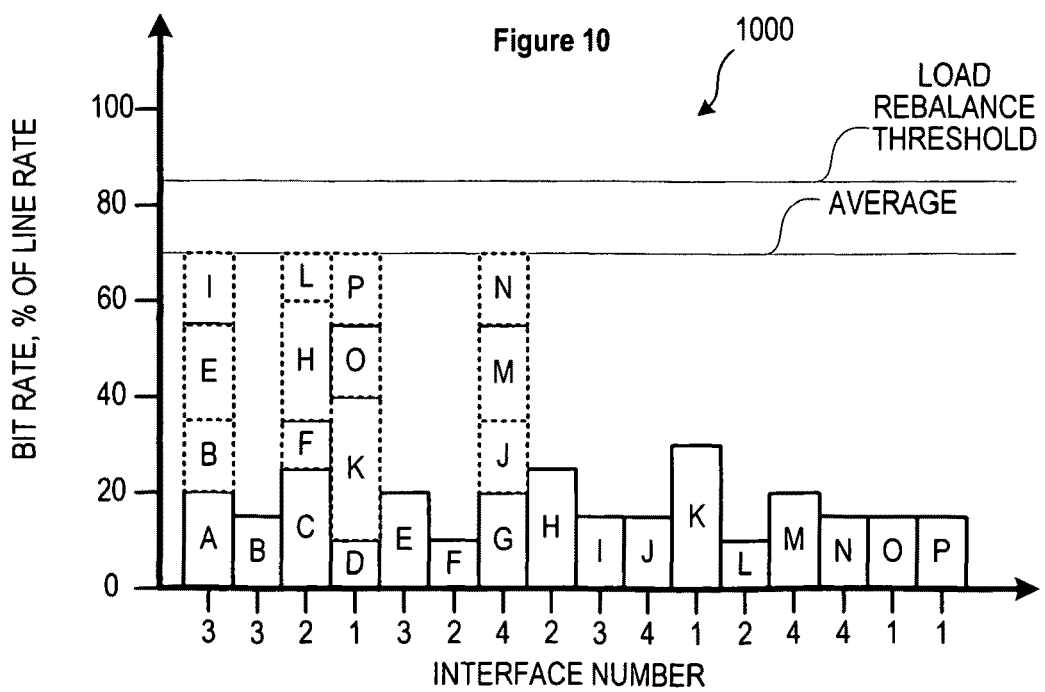
FIG. 10 contains a chart illustrating hash bin assignment according to the adaptive balancing process of FIG. 9.

Once all hash bin groups have been paired with a set, the sets are assigned to an interface. FIG. 10 contains a bar chart of the hash bin groups, illustrating the interface assignments for each group. Hidden lines illustrate the aggregate traffic assigned to each interface.

Figure 11:
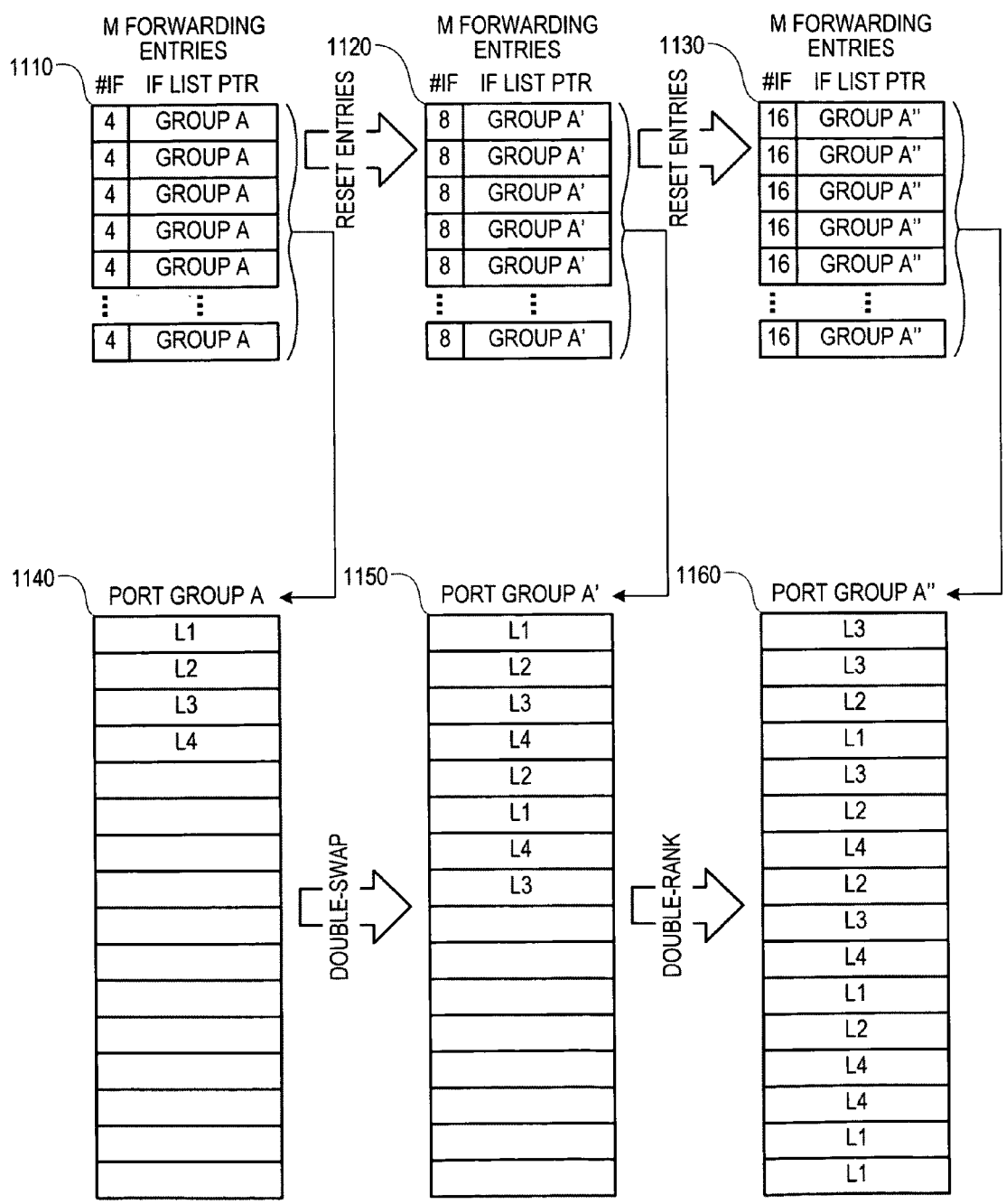
FIGS. 11-14 show examples of port mapping group and/or forwarding entry changes for several embodiments.

FIG. 11 illustrates a progression of interface assignments in an adaptive load balancing example. A group of M forwarding entries 1110 all identify a 4-member port group A, and point to a port group A structure 1140. Port group A structure 1140 has space for 16 entries, but lists only four port interfaces L1, L2, L3, and L4.

An adaptive load balancing process determines that a rebalance is required for port group A, and subsequently builds a new port group A' structure 1150. Using the method described above for doubling the number of entries and then performing swaps within the second half of the entries, port group A' effects the movement of hash groups among the four interfaces. Once the port group A' structure 1150 is ready, the M forwarding entries in group 1110 are modified or replaced with a new group 1120. The entries in group 1120 identify the 8-member port group A', and point to the port group A' structure 1150.

The adaptive load balancing process subsequently determines that another rebalance is required for port group A, and thus builds a new port group A" structure 1160. Using the method described above for doubling the number of entries and then ranking and pairing hash bin groups, the load balancing process arrives at the 16-member interface assignment shown in structure 1160. Once the port group A" structure 1160 is ready, the M forwarding entries in group 1120 are modified or replaced with a new group 1130. The entries in group 1130 identify the 16-member port group A", and point to the port group A" structure 1160.

In cases where the interfaces in a port group structure are all valid, it is possible to modify or add to the port group structure in place, instead of creating a new port group structure. After the structure is modified, the number of forwarding entries in the forwarding entry group is changed, if necessary, without changing the structure pointer. The master route processor maintains a copy of the actual port group membership, which it can use to reset and start over should an interface be added to or dropped from the port group.

Figure 12:
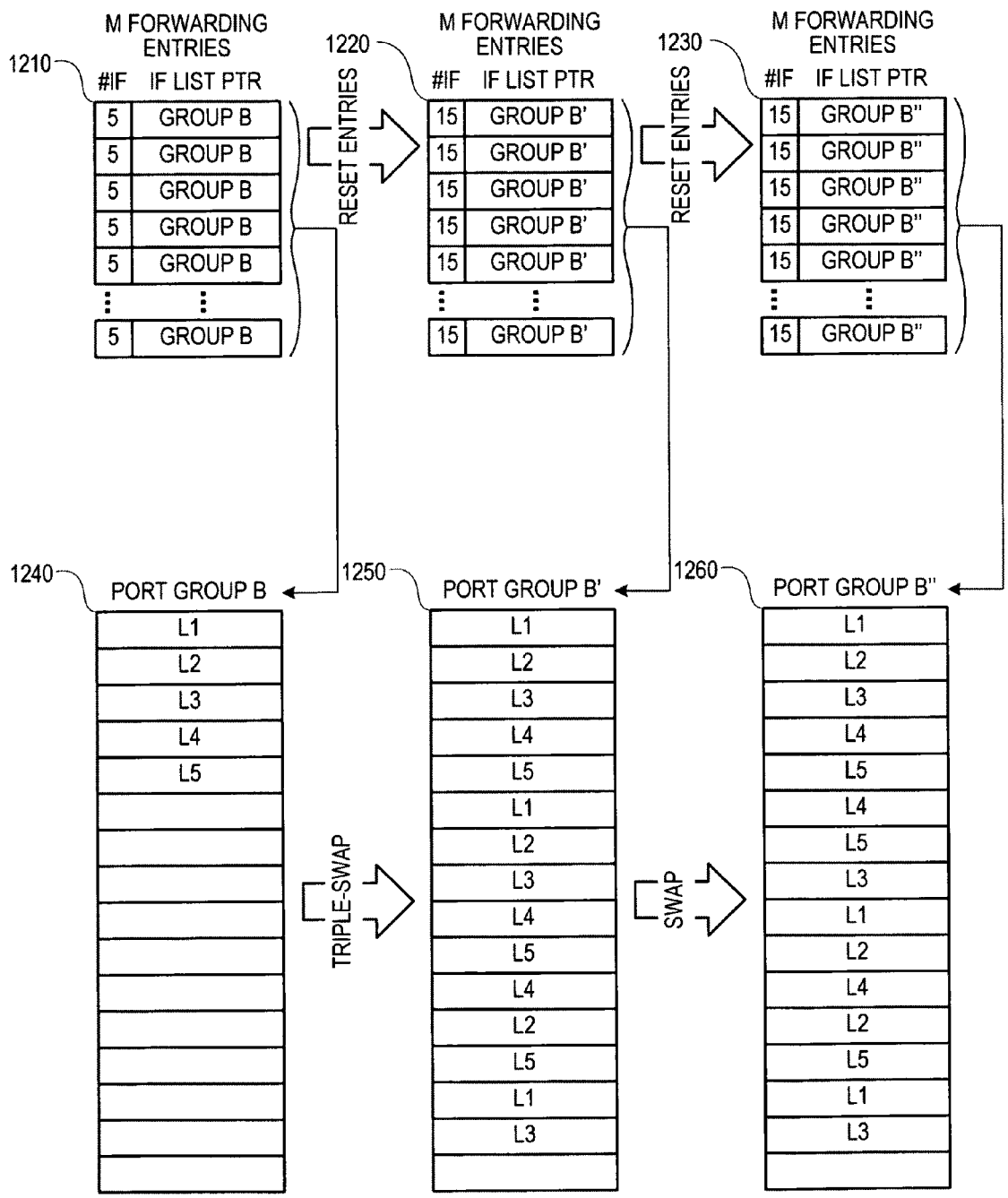

FIG. 12 illustrates a progression of interface assignments in a second adaptive load balancing example. A group of M forwarding entries 1210 all identify a 5-member port group B, and point to a port group B structure 1240. Port group B structure 1240 has space for 16 entries, but lists only five port interfaces L1, L2, L3, L4, and L5.

An adaptive load balancing process determines that a rebalance is required for port group B, and subsequently builds a new port group B' structure 1250. The adaptive load balancing process triples the number of entries and then performs swaps within the last third of the entries, effecting the movement of ⅓ of the hash groups among the five interfaces in port group B'. Once the port group B' structure 1250 is ready, the M forwarding entries in group 1210 are modified or replaced with a new group 1220. The entries in group 1220 identify the 15-member port group B', and point to the port group B' structure 1250.

The adaptive load balancing process subsequently determines that another rebalance is required for port group B, and thus builds a new port group B" structure 1260. As only one empty entry remains in the port group structure, a method that expands the number of groups (e.g., by a factor of 2 or 3) is unavailable. Accordingly, the adaptive load balancing process performs a swap, this time in the middle third of the structure, of an entry corresponding to the most heavily loaded interface with an entry corresponding to the least heavily loaded interface, and an entry corresponding to the second most heavily loaded interface with an entry corresponding to the second least heavily loaded interface. This produces a new port group B" structure 1260. This process may or may not adjust the loading in the correct direction, depending on the loading in the hash bin groups that actually switch interfaces. If the imbalance persists, the entries in a different third of the structure can be swapped. Once the port group B" structure 1260 is ready, the M forwarding entries in group 1220 are modified or replaced with a new group 1230. The entries in group 1230 point to the port group B" structure 1260.

Figure 13:
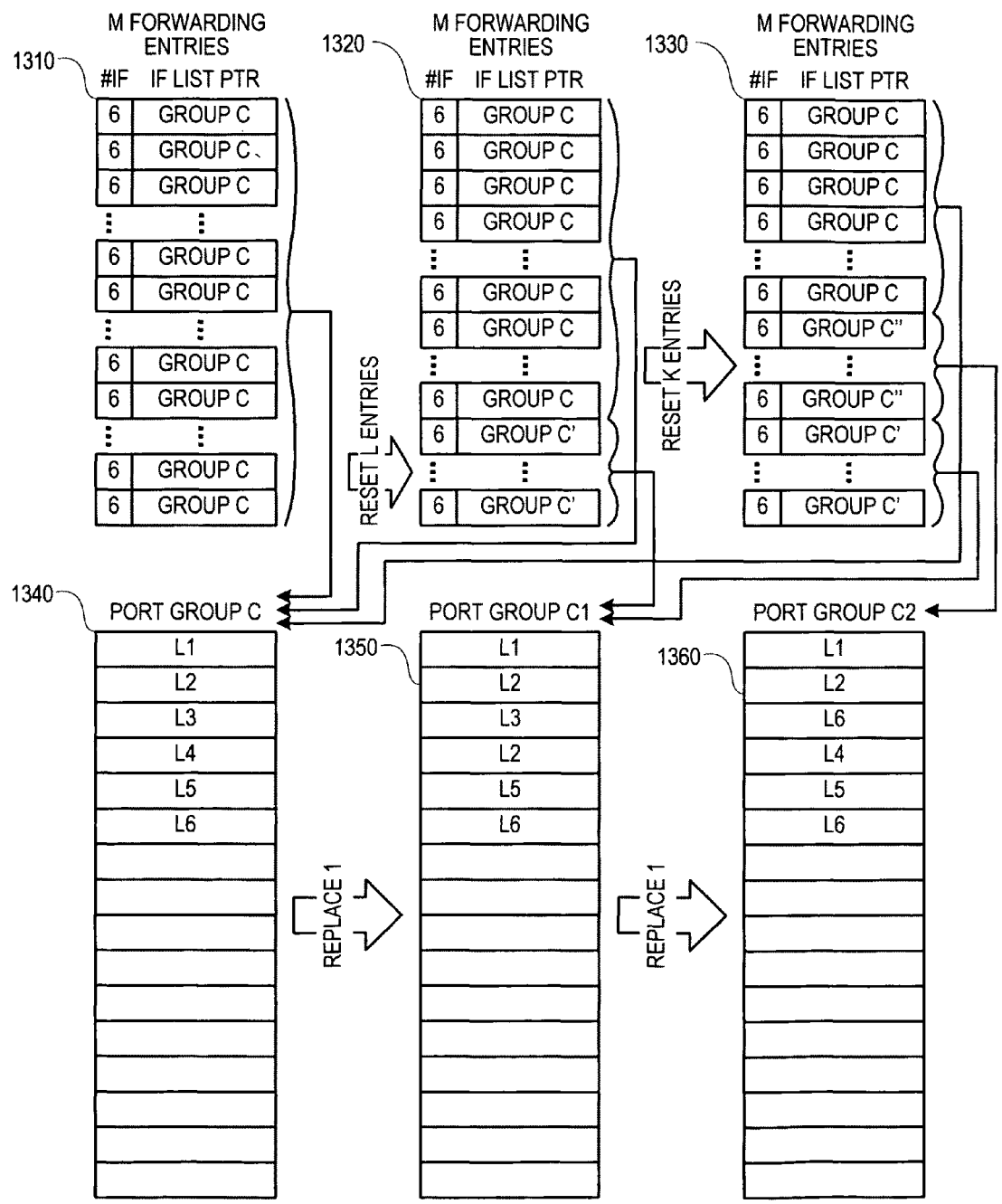

FIG. 13 illustrates a progression of interface assignments in a third adaptive load balancing example. A group of M forwarding entries 1310 all identify a 6-member port group C, and point to a port group C structure 1340. Port group C structure 1340 has space for 16 entries, but lists only six port interfaces L1, L2, L3, L4, L5, and L6.

An adaptive load balancing process determines that a rebalance is required for port group C, and subsequently builds a new port group C1 structure 1350. The adaptive load balancing process copies the port group C entries to the new structure 1350, and then replaces the entry for the most heavily loaded interface (in this example L4) with the entry for the least heavily loaded interface (in this example L2). The adaptive load balancing process then determines a percentage of the M forwarding entries 1310 to modify. For instance, the load on L4 and L2 is averaged, and then the process determines a fraction LB of L4's traffic that must be moved away from L4 to reach the average. The process then selects L of the M forwarding entries for reprogramming, where L=M×LB. The L entries are modified to point to port group C1 structure 1350, while the remaining M-L entries continue to point to port group C structure 1340. If an imbalance persists, additional forwarding entries can be moved between groups C and C1 to effect fine adjustments.

The adaptive load balancing process subsequently determines that another rebalance is required for port group C, and thus builds a new port group C2 structure 1360 by duplicating structure 1340 and modifying. This time, interface L3 has become imbalanced. A second interface with the lowest traffic load, this time L6, is selected to replace the L3 entry in structure 1360. The adaptive load balancing process then determines a percentage of the M forwarding entries 1320 to modify. The load on L3 and L6 is averaged, and then the process determines a fraction LC of L3's traffic that must be moved away from L3 to reach the average. The process then selects K of the M-L entries pointing to port group C and modifies those entries to point instead to the port group C2 structure 1360, where K=M×LC. The load balances between L2 and L4 and between L3 and L6 can continue to be fine-tuned independently, if desired, by movement of forwarding entries back and forth between port group C and port group C1 or C2, respectively. A similar port group C3 (not shown) could also be constructed to move traffic back and forth between L1 and L5. Should an imbalance reverse, e.g., port group C1 is pointed to by no entries and L2 traffic still exceeds L4 traffic, the two L2 entries in C1 can be replaced with two L4 entries to move entries away from L2.

Figure 14:
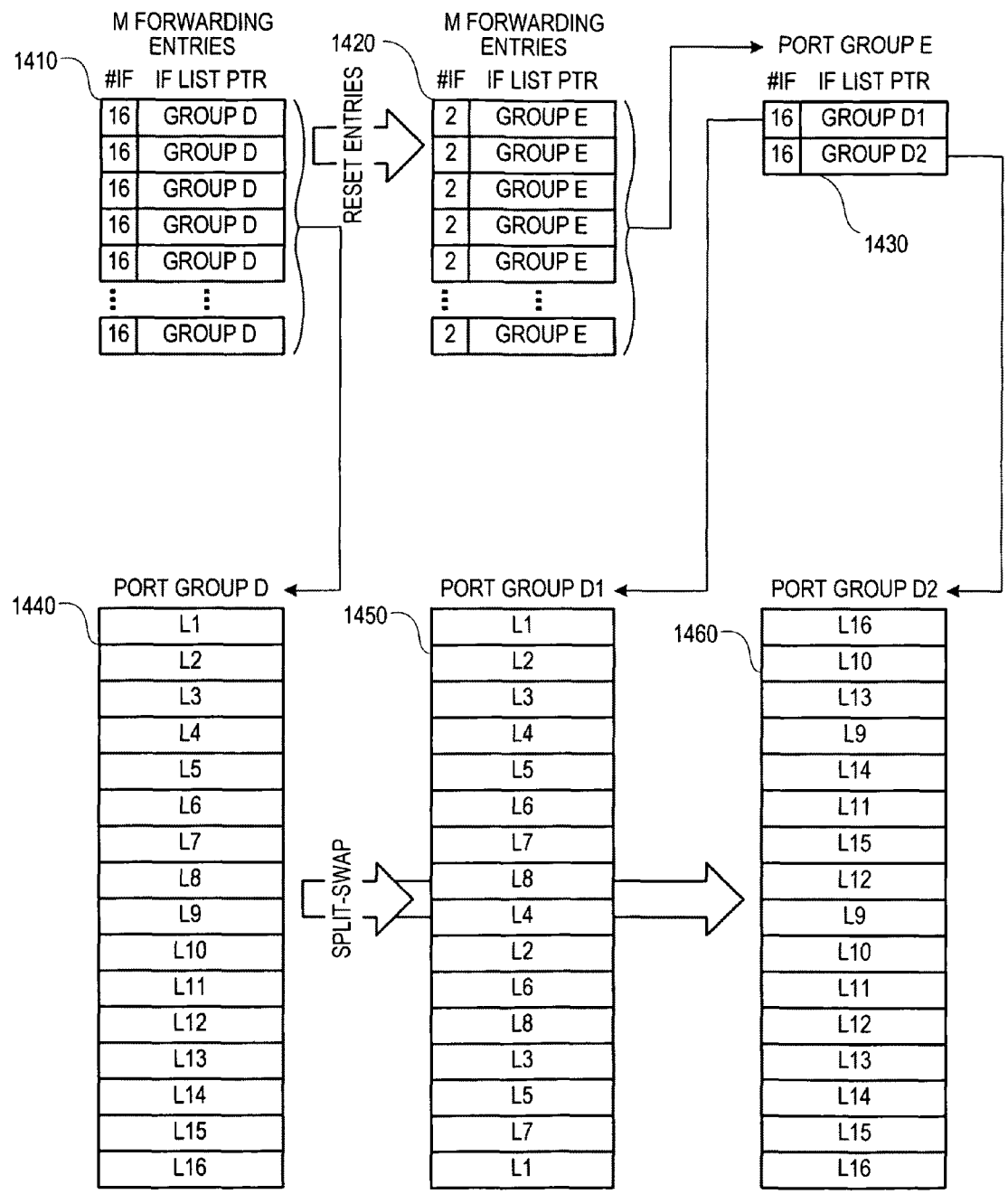

FIG. 14 illustrates a modification of interface assignments in a fourth adaptive load balancing example. A group of M forwarding entries 1410 all identify a 16-member port group D, and point to a port group D structure 1440. Port group D structure 1440 has space for 16 entries, and is completely full with 16 entries L1 to L16.

An adaptive load balancing process determines that a rebalance is required for port group D, and subsequently builds three new port group structures, a port group D1 structure 1450, a port group D2 structure 1460, and a port group E structure 1430. The port group D1 structure contains only entries for interfaces L1 to L8, and the port group D2 structure contains only entries for interfaces L9 to L16. Considering port group D1, the load balancing process looks at the current load on all 16 interfaces. In one embodiment, L1 to L8 retain their original entry positions, and gain an additional entry according to the following process. The port from the group L1 to L8 with the highest traffic load is granted an additional entry previously occupied by the port from the group L9 to L16 having the lowest traffic load. The port from the group L1 to L8 with the lowest traffic load is granted an additional entry previously occupied by the port from the group L9 to L16 having the highest traffic load. This assignment process works inwards until all ports from the group L1 to L8 have two entries in port group D1 structure 1450. The interface assignments for port group D2 structure 1460 is the same, but substitutes interfaces L9 to L16 for interfaces L1 to L8.

The new port group E contains a two-entry structure 1430. Instead of pointing to physical interfaces, however, the entries in structure 1430 point to one of the two structures 1450 and 1460. Once the port group D1, D2, and E structures are ready, the M forwarding entries in group 1410 are modified or replaced with a new group 1420. The entries in group 1420 identify the 2-member port group E, and point to the port group E structure 1430. When a packet processor uses the port group E structure, it performs a modulo 2 operation on the packet hash value to select one of the two entries in structure 1430. As these entries point to further port group structures with 16 entries, the packet processor then performs a modulo 16 operation on the packet hash value to select one of the 16 entries in either structure 1450 or 1460, as appropriate, to obtain an outbound interface.

The initial selection of interfaces in port groups D1 and D2 does not have to be based on numerical port assignments, but can also be made to roughly balance current traffic between the two groups. When subsequent imbalances occur in one of the port groups, that group can be adjusted using, e.g., a swap process previously described. Imbalances between the two groups can be addressed, in one embodiment, by doubling the number of entries in port group E and populating the structure in the order D1, D2, D2, D1 to swap half of the initial hash bins between the two groups.

In one software implementation, the RP executes the load balancing process, which maintains the physical interface groupings and state information for each grouping on the current port group structures as programmed to the line cards. Depending on the size of the physical interface groups, the capabilities of the line cards involved, and the configuration of the groupings (e.g., LAG-only, ECMP-only, or ECMP-of-LAGs), the load balancing process may select different ones of the techniques above for different physical interface groupings. When the RP arrives at a new or modified port group structure, it instructs the line card processors to update corresponding structures wherever the structures reside on the line card (e.g., in CAM entries, memory on the packet processors, or external RAM accessible by the packet processors). Likewise, when the RP determines that it is safe to move forwarding entries to point to a different port group structure, it instructs the line card processors to update the appropriate forwarding entries on the CAM.

A minimal implementation will preferably obtain loading information for each outgoing interface that is in a LAG group or an ECMP group, and use this information to intelligently rebalance. Particularly with an ECMP group, however, the loading information for an interface may reflect a great deal of traffic that belongs to non-ECMP routes or other ECMP routes. Therefore, in other embodiments, a further improvement in load balancing capability can be achieved when the adaptive load balancing process knows the amount of traffic on an interface or LAG that actually belongs to a specific ECMP port group.

In one embodiment, the ingress packet processors compile running statistics that express, for each ECMP or LAG structure entry, the number of bits that were forwarded using that entry, and this information is shared with the RP. In another embodiment, packets are tagged at ingress processing with information identifying the ECMP and/or LAG structures and entries that were used to arrive at an egress interface selection. The egress packet processors compile statistics on the number of bits that are forwarded for each such structure, and share this information with the RP. In these embodiments, the overall traffic on an interface can be adjusted by manipulating just one component of that traffic, when a significant portion of the traffic belongs to an ECMP group. The statistics compilation need not run continuously or for all possible ECMP/LAG structures, but can be targeted to situations where an imbalance exists and to only ECMP/LAG structures of interest.

As opposed to an embodiment like the FIG. 5/6 embodiment that splits hash bins and assumes a corresponding split in traffic, an embodiment having detailed per-hash-bin statistics can potentially perform a much more accurate redistribution of hash bins. For instance, the FIG. 9/10 example uses accurate hash bin statistics to perform more accurate redistribution.

Although the above embodiment examples assume that all ECMP or LAG members have identical bandwidth capability, an embodiment can be adapted to other situations. For instance, if an ECMP route points to two LAGs, one of which has a different number of currently functioning interfaces than the other, the ECMP hash bins can be manipulated to send more traffic to the LAG with more membership.

Those skilled in the art will appreciate that the embodiments and/or various features of the embodiments can be combined in other ways than those described. For instance, in some embodiments a LAG rebalancing process can execute on the line card processor on the same card that contains the LAG interfaces. The line card processor then sends a set of proposed rebalance entries to the route processor when desired, which the route processor propagates to the other line cards. Determination of a LAG interface can be delayed until egress processing in some examples, in which case a LAG rebalancing process according to an embodiment can operate entirely on the target line card. The maximum number of entries in a port group structure can be significantly larger than that illustrated in the examples. The examples are not intended to fix a specific mechanism or number or types of lookups required to arrive at an outbound interface for a packet. Although the determination of interface structures and routing entries will typically be accomplished in software running on a general purpose processor, in many embodiments these structures and entries will be maintained in random access memory accessible by the processor, for manipulation and state use, as well as in a CAM or packet processor hardware.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of distributing packet data traffic among a plurality of outgoing packet links in a packet network device, the method comprising:
    for an N-member packet link group among which packet traffic is distributed, N>1, forming an interface structure containing more than N members;
    associating each member of the packet link group with one or more members of the interface structure;
    receiving statistics indicative of an outgoing traffic load on each member of the packet link group and manipulating the association between the packet link group members and the interface structure members based at least in part on the received statistics;
    for an incoming packet, using packet-related information to select a member of the interface structure; and
    selecting a member of the packet link group for outgoing transmission of the incoming packet, selection of the member comprising selecting the member of the packet link group currently associated with the selected member of the interface structure.

2. The method of claim 1, wherein the packet link group comprises a group of links among which packet traffic is distributed according to an equal-cost multipath routing algorithm.

3. The method of claim 2, wherein the group of links comprises at least one logical aggregation of multiple physical links.

4. The method of claim 1, wherein the packet link group comprises a group of physical links that are logically aggregated.

5. The method of claim 1, further comprising comparing the statistics to a traffic imbalance profile to determine whether manipulation of the association is warranted.

6. The method of claim 5, wherein the traffic imbalance profile triggers manipulation of the association when statistics indicative of the outgoing traffic load on at least one of the packet link group members show that the at least one member has a traffic load above a threshold.

7. The method of claim 6, wherein the threshold is based on an average load for the packet link group.

8. The method of claim 5, wherein the traffic imbalance profile triggers manipulation of the association when statistics of the outgoing traffic load on each member show that the load difference between at least two of the packet link group members exceeds a threshold.

9. The method of claim 1, wherein using packet-related information to select a member of the interface structure comprises submitting the packet-related information to a hashing procedure to select a member of the interface structure.

10. The method of claim 9, wherein the interface structure comprises M interface structure groups, each having N members, wherein associating each member of the packet link group with one or more members of the interface structure comprises associating the members of the packet link group in a one-to-one correspondence with the interface structure members in each interface structure group, but forming the association in a different order in at least two of the interface structure groups.

11. The method of claim 10, further comprising receiving statistics indicative of the outgoing traffic load on each member of the packet link group, and wherein forming the association in a different order in at least two of the interface structure groups comprises:
    determining the packet link group member with the highest traffic load and the packet link group member with the lowest traffic load;
    for a first one of the interface structure groups, determining a first location within the interface structure group of the association with the packet link group member with the highest traffic load and a second location within the interface structure group of the association with the packet link group member with the lowest traffic load; and
    for a second one of the interface structure groups, having locations corresponding to those in the first one of the interface structure groups, reversing the association of the first location with the association of the second location.

12. The method of claim 11, wherein forming the association in a different order in at least two of the interface structure groups further comprises:
    with N greater than or equal to 4, determining the packet link group member with the second highest traffic load and the packet link group member with the second lowest traffic load;
    for the first one of the interface structure groups, determining a third location within the interface structure group of the association with the packet link group member with the second highest traffic load and a fourth location within the interface structure group of the association with the packet link group member with the second lowest traffic load; and
    for the second one of the interface structure groups, reversing the association of the third location with the association of the fourth location.

13. The method of claim 10, wherein at least one of the interface structure groups contains members associating with a different subset of the packet link group members than the subset of packet link group members associating with a second one of the interface structure groups.

14. The method of claim 10, wherein the hashing procedure selects one of the interface structure groups and then selects one of the interface structure group members in the selected interface structure group.

15. The method of claim 10, further comprising storing multiple forwarding entries, each specifying the packet link group as an outgoing target for packets associated with that forwarding entry, associating at least one of the multiple forwarding entries with a first one of the M interface structure groups, and associating at least one other one of the multiple forwarding entries with a second one of the M interface structure groups.

16. The method of claim 1, further comprising receiving statistics indicative of the outgoing traffic load on each member of the interface, and manipulating the association between the packet link group members and the interface structure members in a manner that better balances outgoing traffic load across the packet link group members as compared to the outgoing traffic load across the packet link group members prior to the manipulation.

17. The method of claim 1, further comprising receiving statistics indicative of the outgoing traffic load on each member of the packet link group, indicating that an imbalance exists between the traffic loads on a first packet link group member and a second packet link group member, and reassociating at least one interface structure member, previously associated with the first packet link group member, with the second packet link group member.

18. A packet network device comprising:
a plurality of outgoing packet data ports;
an interface structure having a plurality of members, each interface structure member associated with one of the packet data ports, the interface structure including at least two members associated with the same packet data port and at least two members associated with different packet data ports;
a forwarding table including at least one entry pointing to the interface structure;
a statistics receiving facility, the statistics receiving facility receiving statistics indicative of the outgoing traffic load at least for outgoing packet data ports that are members of the interface structure;
an interface structure manipulation facility, the manipulation facility adjusting the associations between interface structure members and packet data ports based at least in part on the statistics received by the statistics receiving facility; and
an outgoing port selector that, when an incoming packet triggers a forwarding table entry pointing to the interface structure, uses information related to the incoming packet to select a member of the current interface structure and a corresponding outgoing packet data port.

\* \* \* \* \*